US006621416B2

(12) United States Patent
Okamura

(10) Patent No.: US 6,621,416 B2
(45) Date of Patent: Sep. 16, 2003

(54) ELECTRONIC TAG DEVICE

(75) Inventor: Eiji Okamura, Tokyo (JP)

(73) Assignee: Leading Information Technology Institute, Inc., Tokyo (JP)

( * ) Notice: Subject to any disclaimer, the term of this patent is extended or adjusted under 35 U.S.C. 154(b) by 0 days.

(21) Appl. No.: 09/746,849

(22) Filed: Dec. 21, 2000

(65) Prior Publication Data

US 2002/0027506 A1 Mar. 7, 2002

(30) Foreign Application Priority Data

Jul. 21, 2000 (JP) ........................................ 2000-221299

(51) Int. Cl.⁷ .............................................. G08B 21/00
(52) U.S. Cl. .................. 340/571; 340/572.8; 340/572.9; 340/693.5
(58) Field of Search .......................... 340/572.8, 572.1, 340/572.9, 571, 693.5

(56) References Cited

U.S. PATENT DOCUMENTS

| | | | | |
|---|---|---|---|---|
| 4,527,153 A | * | 7/1985 | Suzuki et al. ............ | 340/572.2 |
| 4,712,094 A | * | 12/1987 | Bolson, Sr. ................. | 324/329 |
| RE34,936 E | * | 5/1995 | Campbell et al. ............. | 40/300 |
| 5,485,148 A | * | 1/1996 | Tseng ...................... | 340/10.41 |
| 6,049,279 A | * | 4/2000 | Minarovic ................... | 175/26 |

* cited by examiner

Primary Examiner—Daniel J. Wu

(57) ABSTRACT

The entire status of a large volume of products in the form of large sheets of fabric (or other flexible material) each wrapped around a core incorporating an electronic tag can easily and accurately be distinguished via an antenna of an external reading device. Each core includes an inner tube 30 containing an electronic tag 20, and an outer tube 10 within which the inner tube 30 is free to move lengthwise. When the two tubes are viewed in a plane orthogonal to a common longitudinal axis, the cross section of the inner tube is preferably complementary to that of the outer tube such that an outer surface of the inner tube 30 is surrounded by a similarly shaped internal surface of the outer tube 10, and the inner tube is constrained to move inside the outer tube along said common axis. A weight may be provided within the inner tube 30. Alternatively, the inner tube may be filled with a liquid of a slightly high specific gravity so that the electronic tag 20 floats. When a plurality of outer tubes 10 are aligned, their electronic tags 20 can all be aligned in similar positions.

3 Claims, 9 Drawing Sheets

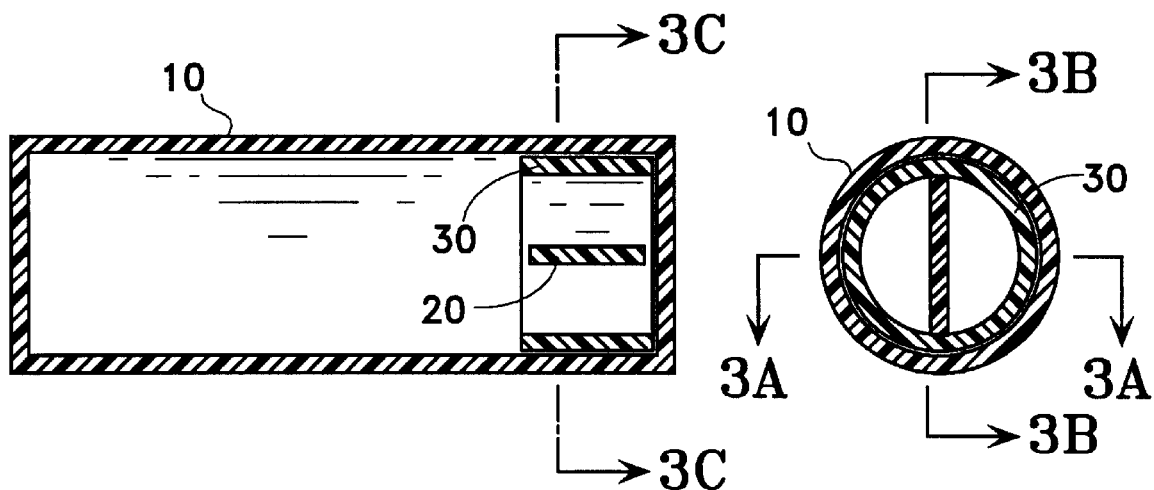
Fig. 3A
Fig. 3C
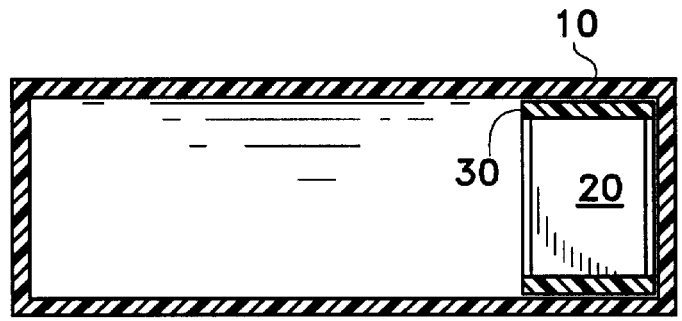
Fig. 3B
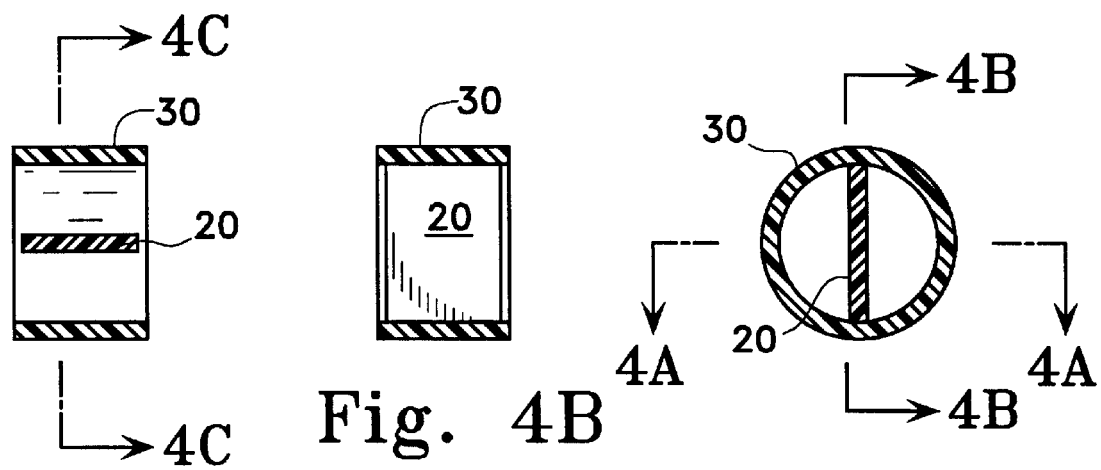
Fig. 4A
Fig. 4B
Fig. 4C

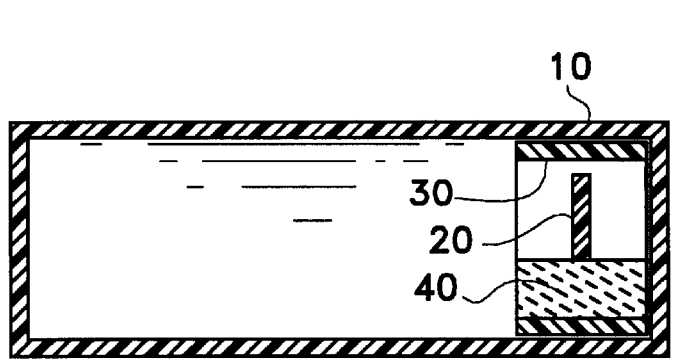
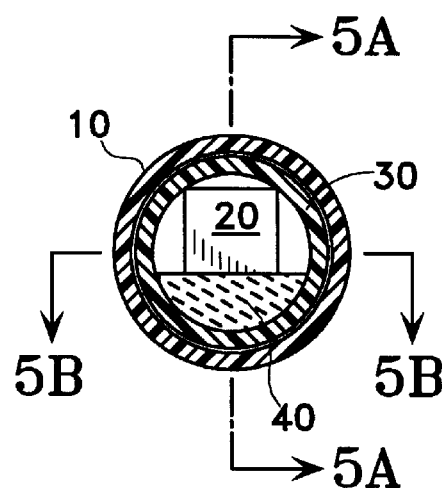
Fig. 5A
Fig. 5C
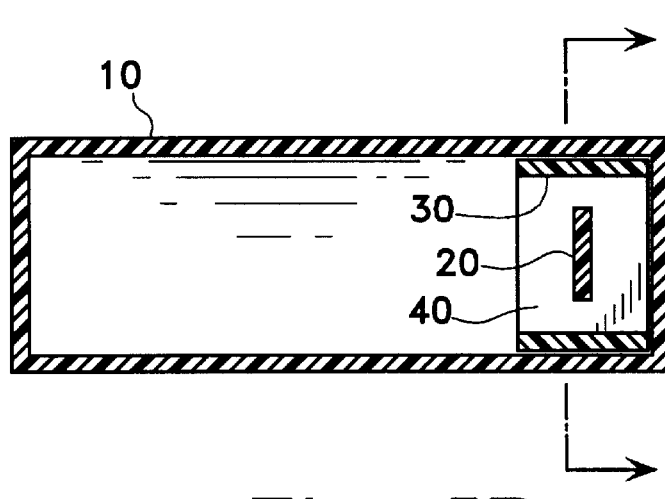
Fig. 5B
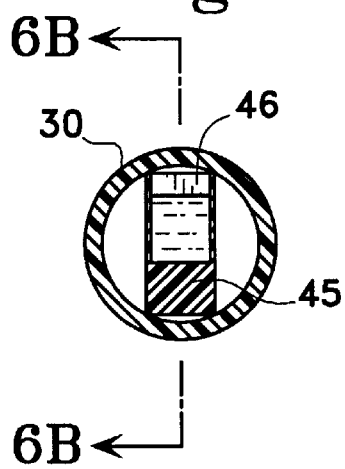
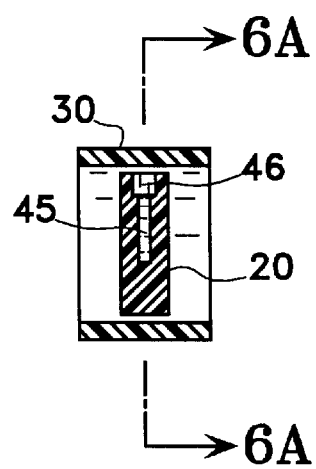
Fig. 6A
Fig. 6B

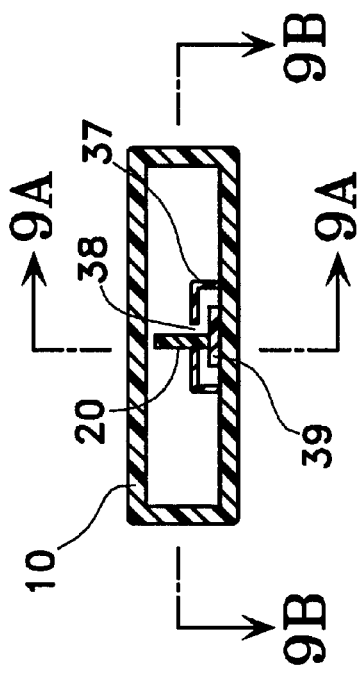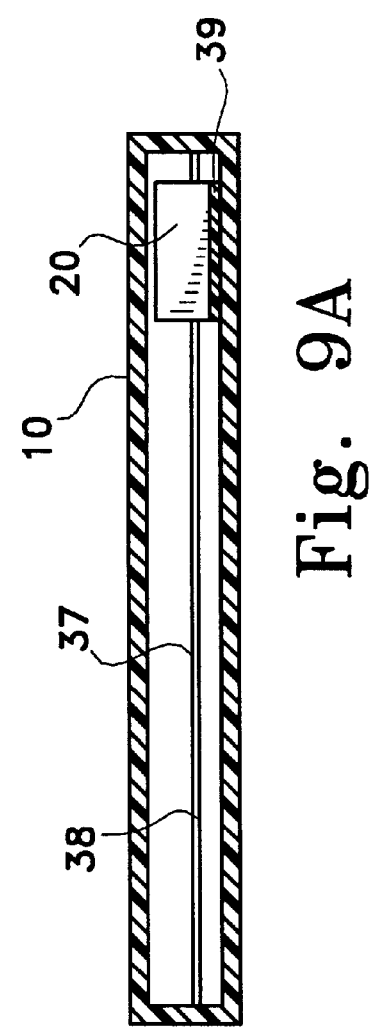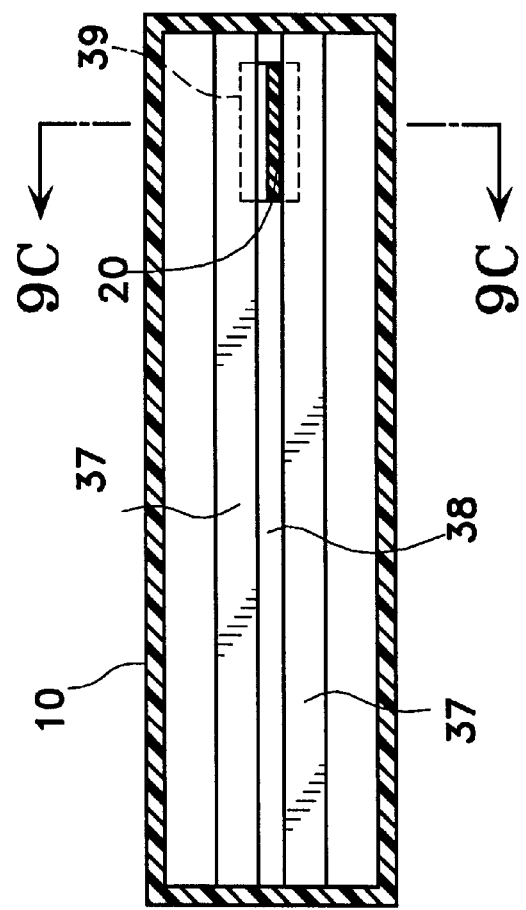

ELECTRONIC TAG DEVICE

BACKGROUND

The present invention relates to an electronic tag device included within a core around which is wrapped a flexible material such as a textile, cloth, or the like.

Conventionally, when information regarding the material, price and the like of an item is to be printed on items sold at retail, it is printed on a separate piece of paper known as a tag which is attached to the item. When this type of tag is made out of paper, it is necessary to perform the work of producing it and printing the price and the like thereon, and it is difficult to read. Thus, in recent years paper tags are being converted to electronic tags that can be electronically processed, as shown in FIG. 11. Because information is recorded thereon by means of an electronic device, the information is easy to read and does not easily disappear. This has a big effect on the ability of store employees to confirm sales by means of an electronic device, and to easily calculate the amount of sales.

FIG. 11 shows fabric 60, and a core 61 which is a thin square tube formed from paper. An electronic tag 20 is attached to fabric 60. Electronic tag 20 is, for example, an IC board and a cover formed from a polymer resin. Electronic tag 20 is attached to fabric 60 or core 62 by means of a thin cord 62. Because a consumer can look at the numbers and simple words printed on electronic tag 20, he or she will make a judgment with regard to the material, quantity, and price of the fabric and decide whether or not to purchase it.

FIG. 12 is an oblique view showing the gist of a fabric roll price distinguishing device, which can, in a short period of time, identify different types of fabric rolls having electronic tags attached thereto but stored one on top of each other. In FIG. 12, 20 is a plurality of electronic tags, 71 is an antenna for reading the tags, and 65 is a plurality of fabric rolls that each have an electronic tag 20 attached thereto. The plurality of fabric rolls 65 are arranged and stored in container 68, and disposed on top of antenna 71.

Antenna 71 emits signals from an electronic processing device such as a personal computer (not shown) toward electronic tags 20. The data written onto electronic tags 20 separately respond to antenna 71 with a sequential response signal which contains data for separately identifying electronic tags 20.

This sequential response signal contains information on the type of fabric roll, its price, and the like, and thus by using the electronic processing device and electronic tags in which previous data is electronically recorded thereon, things like the condition and cost of a plurality of fabric rolls can be distinguished.

FIG. 13 shows a situation in which data relating to fabric 60 is requested, and the fabric 60 is wound around a cylindrical core 61 with an electronic tag 20 attached thereto. Further, FIG. 14 shows a plurality of similarly shaped fabric rolls and cores/electronic tags stacked one on top of each other, and a state in which the electronic tags will be read in a short period of time. In FIG. 14, 20 is an electronic tag, the square flat board 71 is a tag reading antenna, 61 and 63 are cores, 65 and 66 are a plurality of fabric rolls, and 68 is a container. Data signals are sent and received between antenna 71 and electronic tags 20 in the same manner as that shown in FIG. 12. Thus, the entire group can be distinguished in a short period of time in the same manner as that shown in FIG. 12.

The electronic tag data reading device shown in FIGS. 12 and 14 has a variety of weaknesses. That is, because the antenna is in a fixed position, there is a difference in the sensitivity of the signals that antenna 71 can receive due to the position of the electronic tags. Because of this, in order for the data from a large number of electronic tags to be received without error, it is necessary to divide the antenna coil, and to position the electronic tags as close as possible to the antenna.

FIG. 15 shows the relationship between the position of the antenna coil, the coils of the electronic tags, and the lines of electric flux emitted therefrom. In FIG. 15, 72 is an antenna coil, 73 is an electric tag coil closest to the antenna coil, 74 is an electric tag coil in a position slightly apart from the antenna coil, and 75 is an electronic tag coil furthest away from the antenna coil. In addition, 80 are the electric lines of flux emanating from antenna coil 72.

As shown in FIG. 15, tag coil 73 is in a position closest to antenna coil 72 when compared with those of tag coils 74 and 75. Because the coil surface of the coil tag is parallel with the coil surface of the antenna coil, the largest number of lines of electric flux 80 intersect with the coil surface of tag coil 73 compared to that of tag coils 74 and 75. Said another way, the lowest number of lines of electric flux 80 intersect with tag coils 74 and 75.

Tag coils 74 and 75 are separated by the same distance from the antenna coil. However, there are a smaller number of lines of electric flux that intersect with the coil surface of tag coil 75 because it is orthogonal with respect to the coil surface of the antenna coil.

Because the distance that tag coils 74 and 75 are separated from the antenna coil, and their angle with respect thereto, is larger than that of tag coil 73, antenna coil 72 needs to enlarge the signal strength with respect to tag coils 74 and 75.

In FIG. 14, because the electronic tags are attached to one end of core 61, the distance between the plurality of electronic tags 20 and the antenna 71 is generally fixed. However, because another core 63 has an electronic tag 20 attached in exactly the opposite position, it is much further away from antenna 71 and it is necessary to enlarge the signal strength.

In order to avoid this situation, when fabric rolls 65 are placed in container 68, they must be carefully placed so that the electronic tags 20 are all in the same position. However, this greatly lowers work efficiency.

SUMMARY

Accordingly, it is an object of the present invention to improve the aforementioned weaknesses and make the most of the features of electronic tags by providing an electronic tag device that can easily and reliably distinguish a group of large flexible items with electronic tags attached.

In one embodiment, the electronic tag device is equipped with an inner tube having a built-in electronic tag, an outer tube within which the inner tube is disposed such that can move in the lengthwise direction, and a reading device for reading data recorded on the aforementioned electronic tag. When the two tubes are viewed in a plane orthogonal to a common longitudinal axis, the cross section of the inner tube is preferably complementary to that of the outer tube such that an outer surface of the inner tube is surrounded by a similarly shaped internal surface of the outer tube and the inner tube is constrained to move inside the outer tube along said common axis.

In another embodiment, the electronic tag device incased an outer tube defining a hollow interior space inside which the electronic tag is free to rotate to a predetermined orientation, and a reading device for reading data recorded on the electronic tags.

Alternatively, the electronic tag device may include an inner tube member in which the electronic tag can move in a fixed direction, an outer tube having a hollow interior in which the inner tube member is free to rotate, and a reading device for reading data recorded on the electronic tag.

In regard to the electronic tag, an antenna of the reading device is preferably provided in the vicinity of one end of the outer tube. To facilitate the proper positioning of the tag at the end of the outer tube relative to the antenna, a weight may be provided within the inner tube. Alternatively, the inner tube may be filled with a liquid of a slightly high specific gravity so that the electronic tag floats inside.

When there is just one outer tube, the reading device may easily be positioned near the position of the electronic tag inside, When a plurality of outer tubes are lined up, it is easy to arrange them so that the distances between the electronic tags and the reading device opposite thereto are all uniform.

Because the electronic tag is freely moveable with respect to the outer tube, by tilting a single outer tube as is, or a group of outer tubes lined up together, the electronic tag can move freely therein and will be even with one end thereof. Thus, even if the power emissions in a reading device for reading data recorded on an electronic tag are not exceptionally large, the electronic tag can be read accurately and reliably in the tilted position.

Thus, when rolls of fabric are lined up, even if the direction and position of the attached electronic tags with respect to the antenna is initially uneven, the tags can be effectively and appropriately used.

BRIEF DESCRIPTION OF DRAWINGS

Details of several embodiments of the electronic tag device of the present invention will be explained with reference to the appended figures, in which:

FIG. 3 shows the third embodiment of the electronic tag device of the invention.

FIG. 4 shows the inner tube used in the third embodiment.

FIG. 5 shows the fourth embodiment of the electronic tag device of the invention.

FIG. 6 shows the fifth embodiment of the electronic tag device of the invention.

FIG. 9 shows the eighth embodiment of the electronic tag device of the invention.

DETAILED DESCRIPTION OF EXEMPLARY EMBODIMENTS

First Embodiment

Figure 1A:
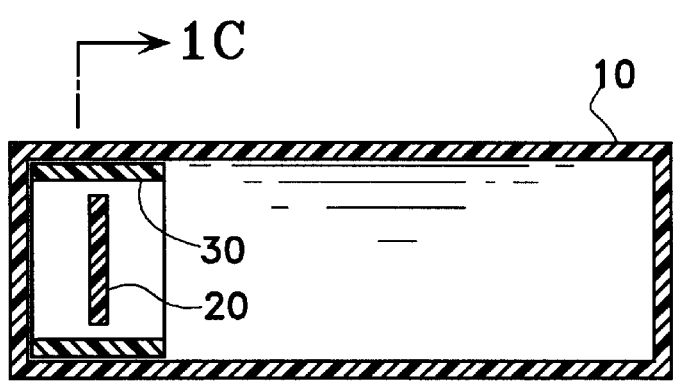
FIG. 1 shows the first embodiment of the electronic tag device of the invention.
Figure 1C:
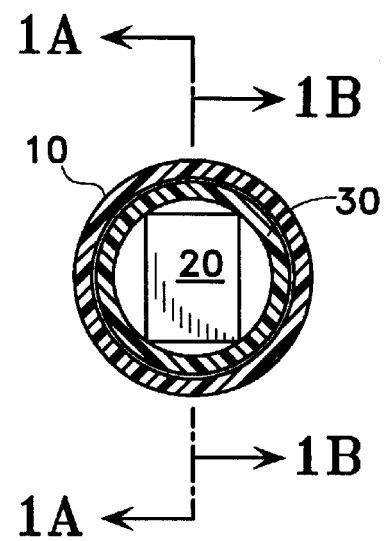
Figure 1B:
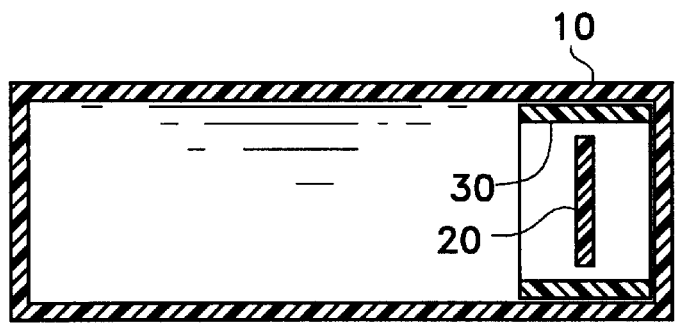

In FIG. 1, (A) is vertical cross-section view, (B) is a horizontal cross-sectional view (from above), and (C) is a side cross-sectional view (from the front). In the figures showing the following embodiments, when the same three views are shown, each cross-section will be shown in the same order.

In FIG. 1, 10 is an outer tube, 20 is an electronic tag, and 30 is an inner tube. A reading device, not shown in FIG. 1, is positioned below electronic tag 20. Inner tube 30 is moveable in the lengthwise direction (left to right in FIG. 1) of outer tube 10. Here, inner tube 30, outer tube 10, electronic tag 20, and the reading device make up the electronic tag device.

The outer circumference [sic] of a cross-section of inner tube 30 taken orthogonally with respect to the direction that inner tube 30 moves inside outer tube 10 (left to right in FIG. 1) is generally equal to the inner circumference of a cross-section of the outer tube 10. In this embodiment, both outer tube 10 and inner tube 30 are cylindrical in shape. Inner tube 30 holds electronic tag 20 as shown in FIG. 2.

Figure 2A:
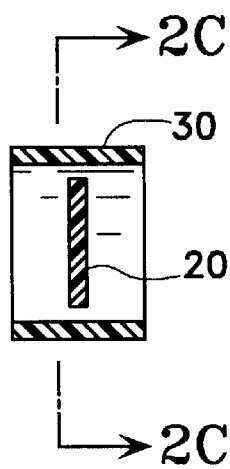
FIG. 2 shows the inner tube used in the first embodiment.
Figure 2B:
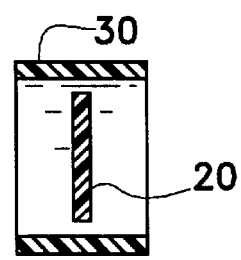
Figure 2C:
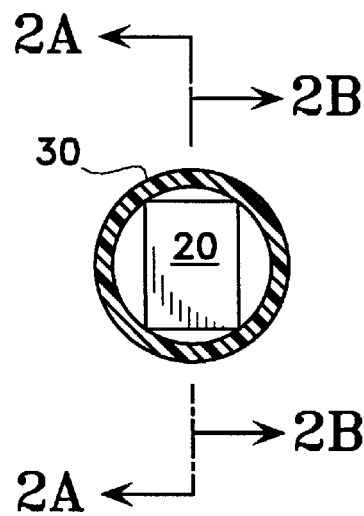

FIG. 2 shows the cylindrical shape of inner tube 30. In FIG. 2, electronic tag 20 is supported at four points by the cylindrical shape of inner tube 30.

As is clear from the composition shown in FIG. 1, because inner tube 30 is inserted into outer tube 10 such that is slides in contact therewith, if the right side (in FIG. 1 (A)) of outer tube 10 is tilted downward, electronic tag 20 will move to the right (in FIG. 1) inside outer tube 10 together with inner tube 30, and will stop at the right end of outer tube 10 as shown in FIG. 1. At this point, inner tube 30 will not tilt with respect to outer tube 10 and will not collapse. That is, when both electronic tag 20 and inner tube 30 move together, their attitude does not change.

After fabric is wound around the core, an outer tube 10 having an electronic tag 20 is inserted therein. At this time, for example, when the antenna on the data reading device is brought close to one end of the outer tube 10, the data recorded on the electronic tag 20 inside the core can be easily and reliably recorded via the antenna.

In the event there are a large number of outer tubes, if that group is arranged to be parallel with each other, by tilting the group of fabric rolls toward the antenna, the electronic tag 20 inside the core will automatically move toward it. Because the positions of a large number of electronic tags can be easily arranged, and the power use of the antenna will not fluctuate due to the position of the electronic tags, the data recorded on all the electronic tags can be easily collected in a short period of time.

Because the reading device needs a device other than an antenna, it is acceptable to place that device in a block the same as the antenna, and bring the antenna portion closer to the electronic tags 20.

Second Embodiment

As a second embodiment of the present invention, it is acceptable for both the outer tube and the inner tube to have an angular shape. Here, the dimensions of the outer circumference and the inner circumference are as provided in the first embodiment. According to this configuration, the operational results of the electronic tag device are the same as those in the first embodiment.

Third Embodiment

Next, a third embodiment of the present invention is shown in FIGS. 3 and 4. As shown in FIG. 3 and 4, the outer tube 10, the electronic tag 20, and the inner tube 30 are the same as shown in the first embodiment. The electronic tag 20 is in inner tube 30, but a point of difference is that electronic tag 20 is held in inner tube 30 such that it is parallel with respect to the direction of the movement of inner tube 30.

When electronic tag 20 is disposed in this manner, the movement of inner tube 30 is the same as in FIGS. 1 and 2. However, when a reading device is put in the same place as in FIG. 1, the relationship between it and electronic tag 20 is worse than that shown in FIG. 1, and thus it is better to place it the upper direction with respect to the plane of the paper of FIG. 3 (A).

Fourth Embodiment

FIG. 5 shows a fourth embodiment of the present invention. In FIG. 5, 10 is an outer tube, 20 is an electronic device, and 30 is an inner tube. 40 is a weight that is unevenly distributed inside inner tube 30. Weight 40 has a large specific gravity, and is, for example, a metal such as copper or lead. With respect to using electronic tag 20 in the wireless frequencies, the material used is one that does not create a screen effect. Weight 40 is fixed inside inner tube 30 so that the attitude of inner tube 30 does not change when data is being read from electronic tag 20.

Electronic tag 20 is fixed in the lower part of the inside of inner tube 30 by means of weight 40. When inner tube 30 moves inside outer tube 10, electronic tag 20 inside inner tube 30 is pulled down by gravity and positioned like that shown in FIG. 1. Thus, in this embodiment, when a large number of outer tubes 10 are lined up, the electronic tags 20 are in a uniform position with respect to the antenna.

Fifth Embodiment

FIG. 6 shows a fifth embodiment of the present invention. In FIG. 6, inner tube 30 is a short cylindrical shape, and (A) shows a front view and (B) shows a side view. In FIG. 6, 45 is a liquid, and 46 is a float. The specific gravity of float 46 is smaller than that of liquid 45 and the material outside electronic tag 20, and both float 46 and the material outside electronic tag 20 is selected from a material that will not be dissolved by liquid 45. Float 46 is fixed to one end of electronic tag 20. In addition, in FIG. 6, 10, 20, and 30 are the same elements as those shown in FIG. 1.

When liquid 45, electronic tag 20 and float 46 are in the state shown in FIG. 6, electronic tag 20 is in the inner portion of inner tube 30 and always floats on the top thereof due to the difference in specific gravities. Thus, this situation is the same as that in FIG. 5, in that when a large number of outer tubes are lined up, the electronic tags 20 are in a uniform position with respect to the antenna.

Sixth Embodiment

Figure 7C:
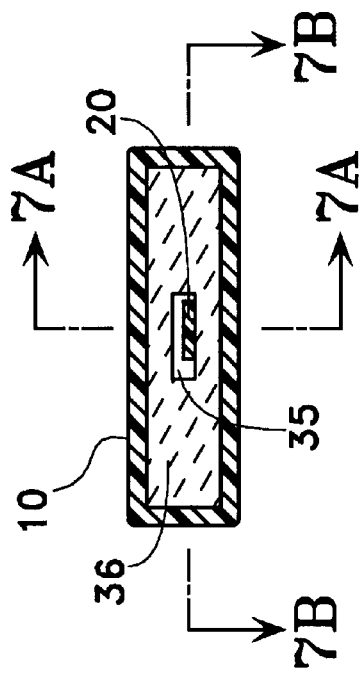
FIG. 7 shows the sixth embodiment of the electronic tag device of the invention.
Figure 7A:
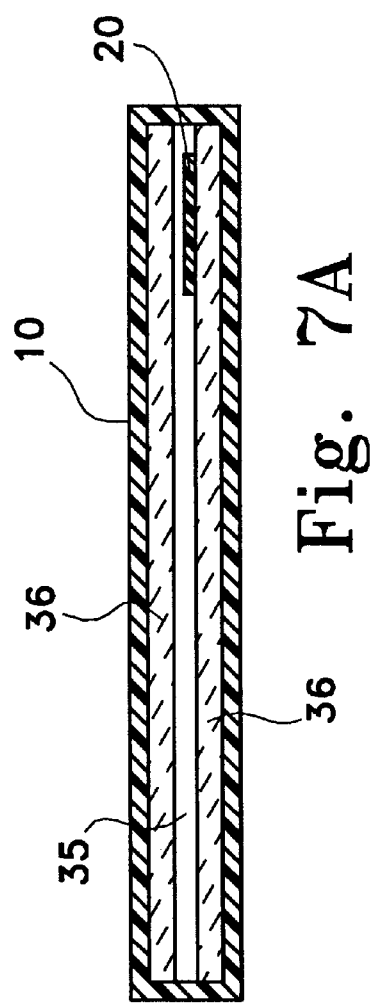
Figure 7B:
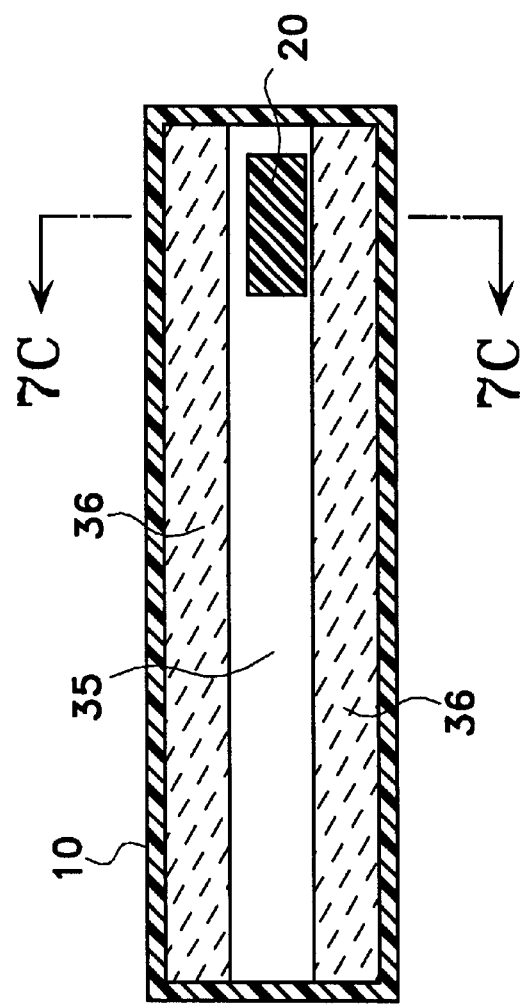

FIG. 7 shows a sixth embodiment of the present invention. In FIG. 7, hollow space 35 is generally positioned in the central portion of outer tube 10, and filler 36 is inserted into outer tube 36. Hollow space 35 is formed in a space in filler 36 so that electronic tag 20 is movable in the axial direction of outer tube 10.

When electronic tag 20 moves in hollow space 35, abnormal movement such as rotation or tilting is difficult, and thus its relative position with respect to the item outside outer tube 10 is uniform.

Seventh Embodiment

Figure 8C:
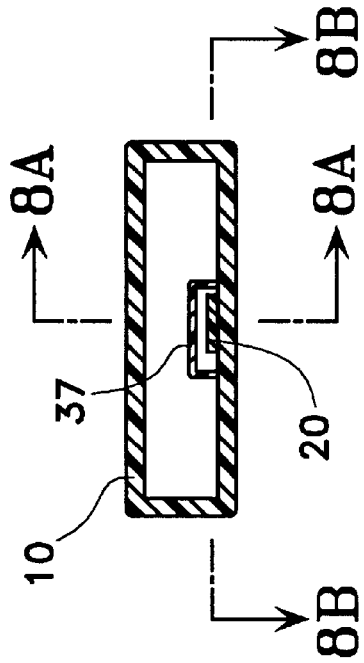
FIG. 8 shows the seventh embodiment of the electronic tag device of the invention.
Figure 8A:
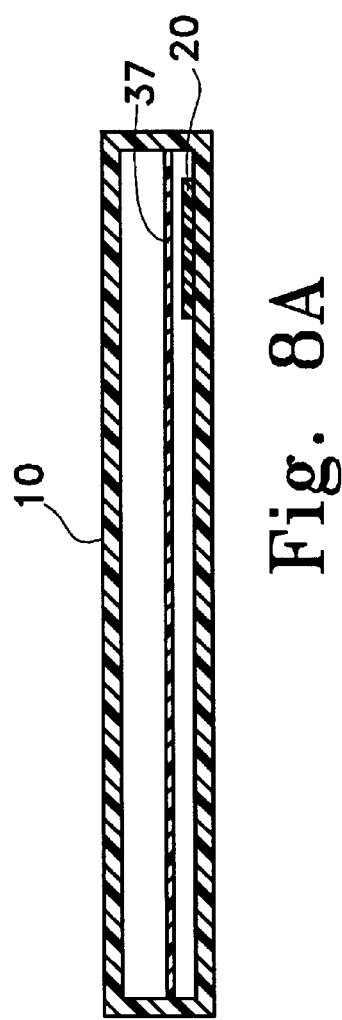
Figure 8B:
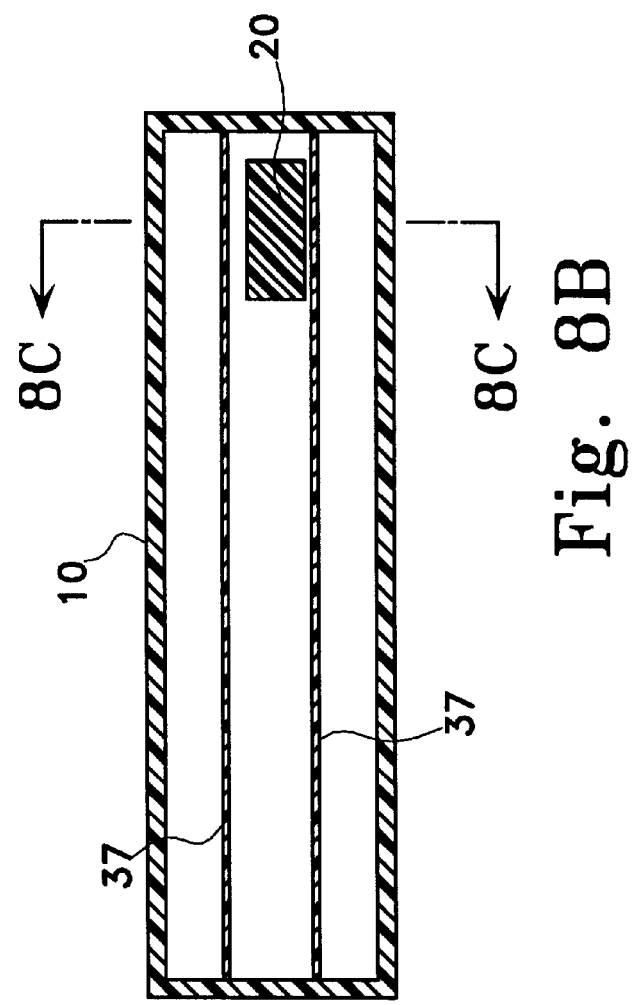

In FIG. 8, 10 is the outer tube, 20 is the electronic tag, and 37 is an inner tube member. The inner tube member 37, as shown in the figure, is disposed below the center of outer tube 10, comes into contact with the lower wall of outer tube 10, and forms a small cylindrical shape.

As shown in the figure, the electronic tag can move in correspondence with the movement of outer tube 10, but because at the time of this movement abnormal movement such as rotation or tilting and the like is difficult, the relative direction of electronic tag 20 is uniform regardless of the position of outer tube 10. Because of this, even if there are a plurality of outer tubes, data can be collected from the electronic tags by the antenna with an even amount of power because they are all in a uniform direction.

Eighth Embodiment

FIG. 9 shows an eighth embodiment of the present invention. In FIG. 9, 10 is the outer tube, 20 is the electronic tag, 37 is the inner tube member, 38 is a slit, and 39 is a base. Inner tube member 37 has the same shape as that shown in FIG. 8, and is formed inside outer tube 10. However, in FIG. 9 slit 38 is provided in the hollow space of outer tube 10 in the axial direction. Electronic tag 20 is attached on top of base 39 in the vertical direction, and a portion of electronic tag 20 projects up toward outer tube 10 through slit 38.

Electronic tag 20, in the case of FIG. 9, can move in the axial direction of outer tube 10 together with base 39 in the hollow space of inner tube member 37. Because the aforementioned slit 38 becomes a guide at the time of movement, there is no tilting or rotation in the direction of movement or in the orthogonal direction. Thus, as explained above, an electronic tag with the same shape can be used.

Figure 10:
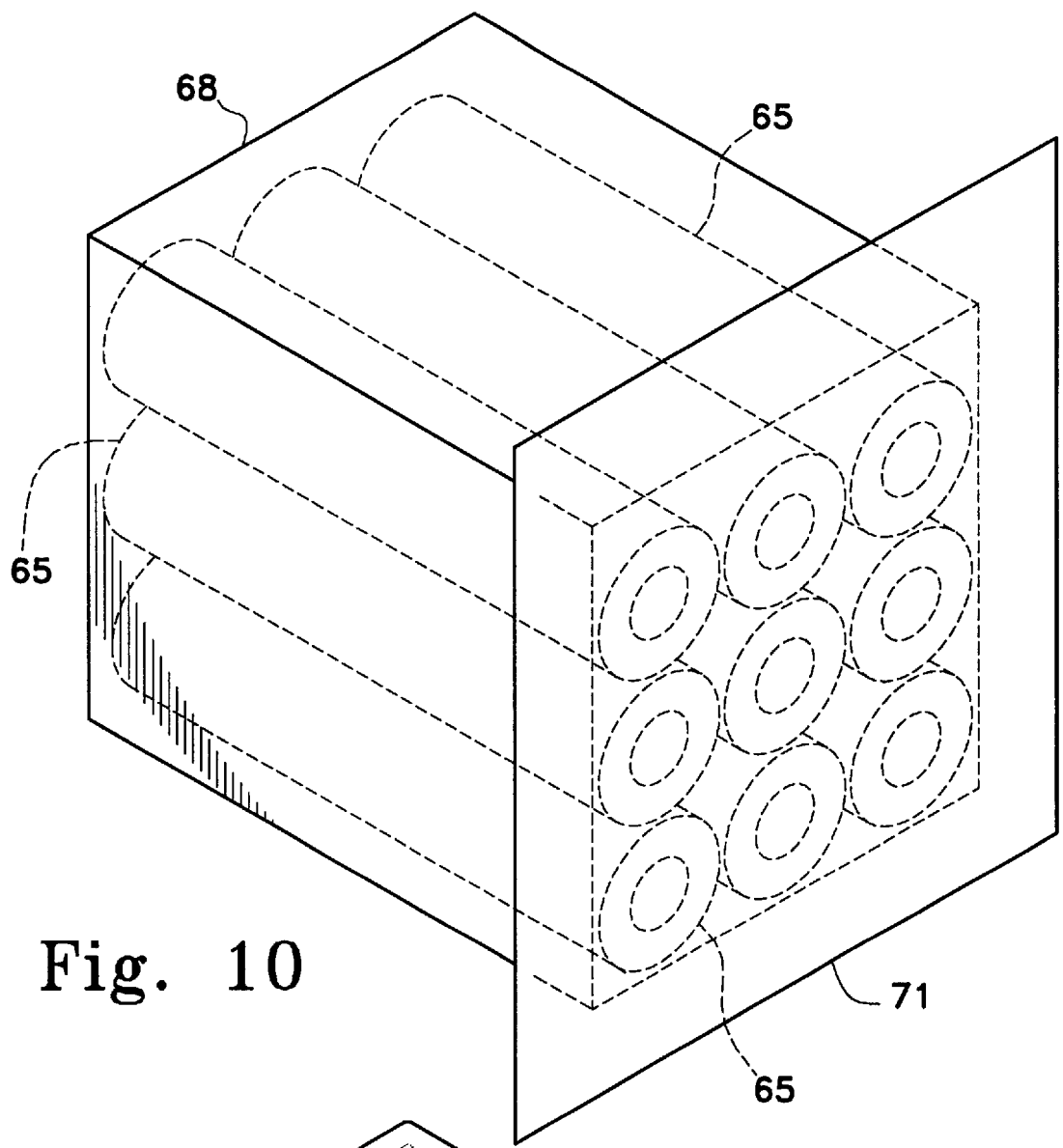
FIG. 10 illustrates the quick reading of a plurality of the electronic tags applying the embodiments of the invention.
Figure 11:
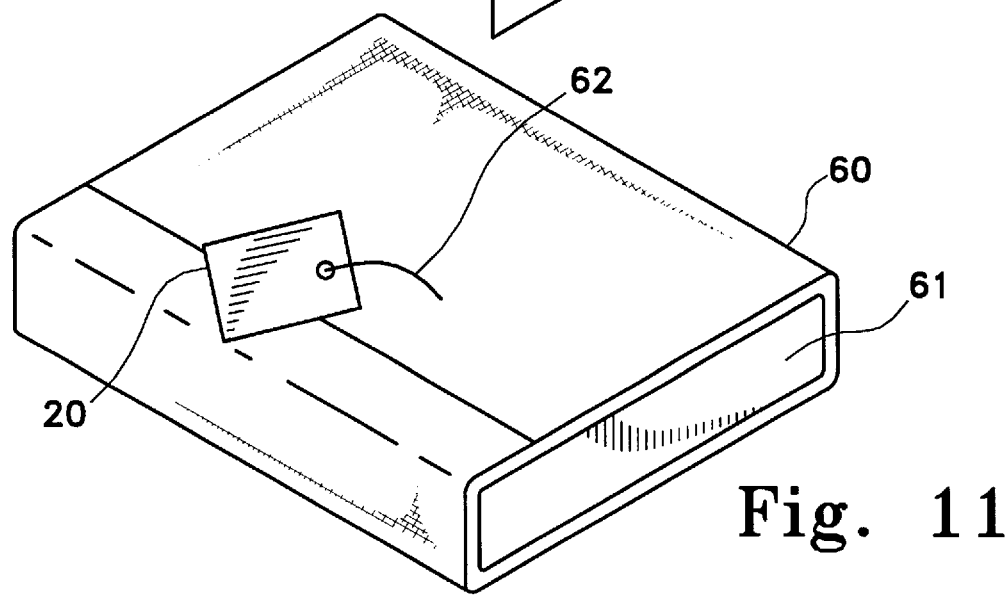
FIG. 11 illustrates a conventional electronic tag in use attached to a fabric core.
Figure 12:
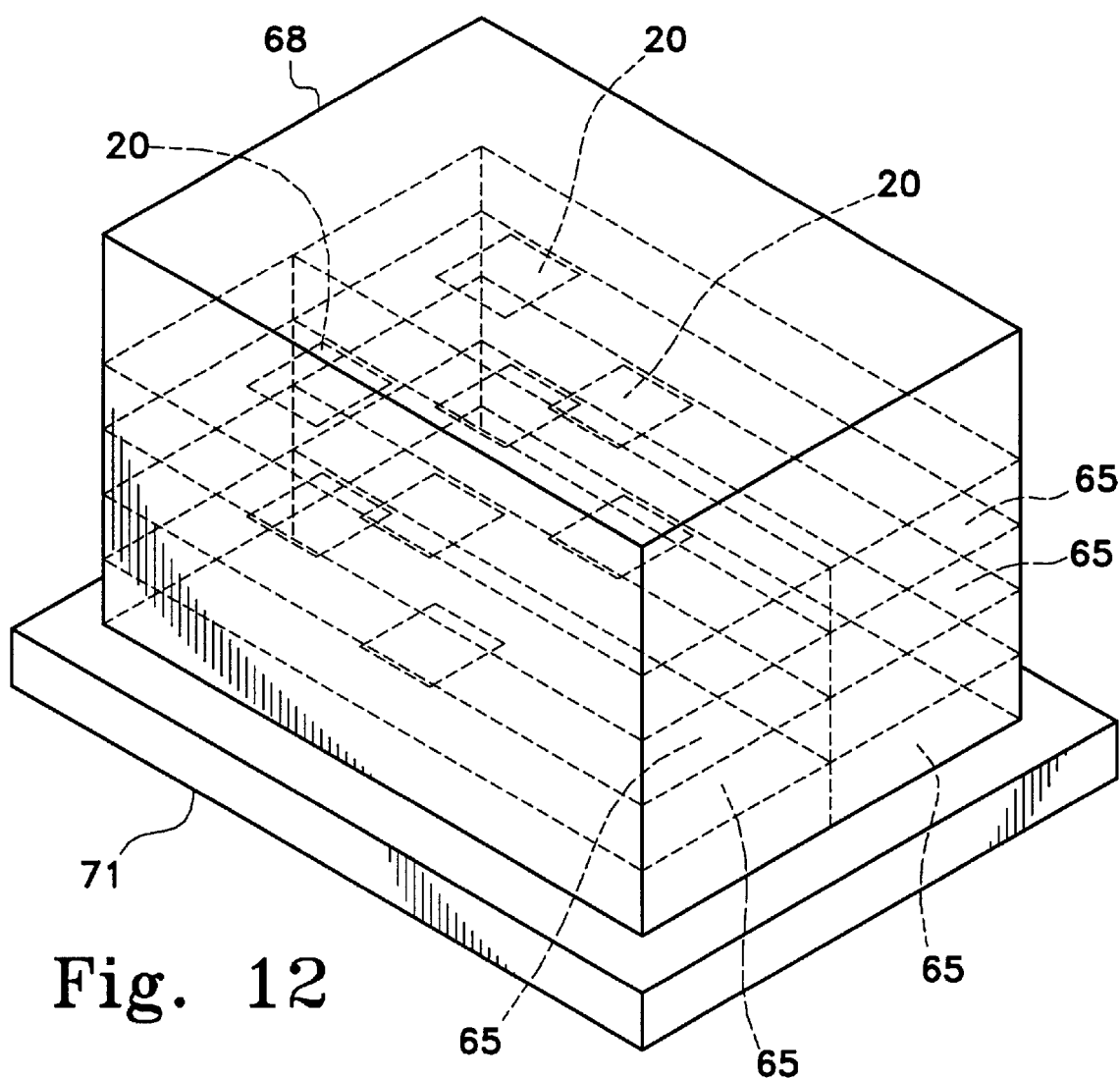
FIG. 12 illustrates electronic tags applied to a conventional selection of a plurality of textiles of differing types.
Figure 13:
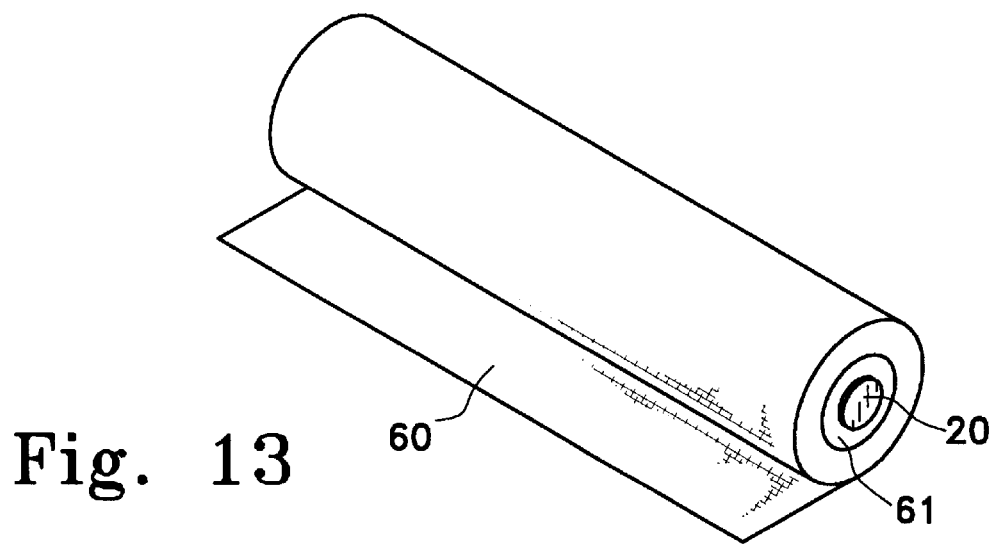
FIG. 13 illustrates the usage of a fabric on a conventional cylindrical core and an electronic tag attached thereto.
Figure 14:
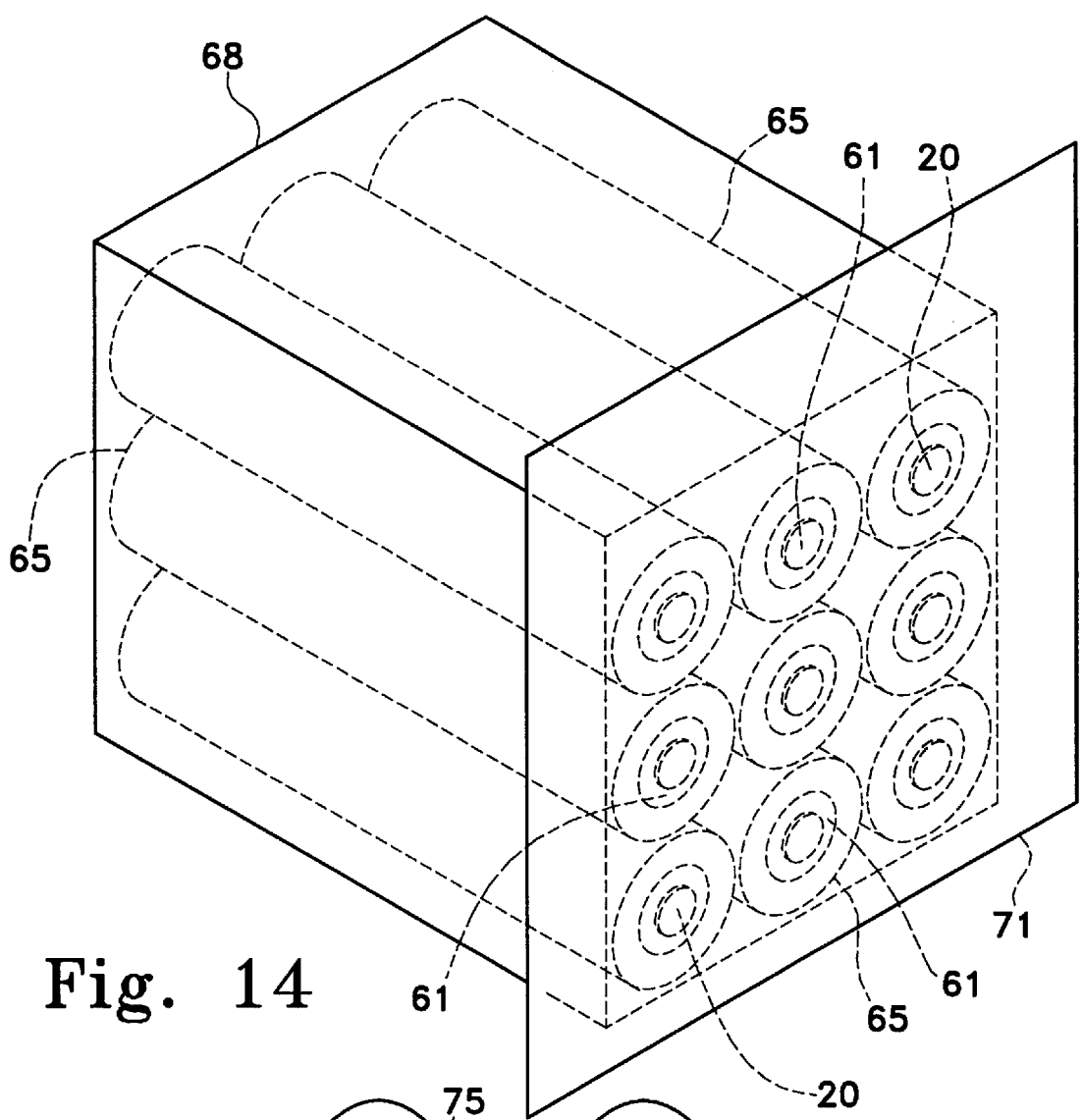
FIG. 14 illustrates the quick reading of an entire stack of a plurality of the core and fabric seen in FIG. 13.
Figure 15:
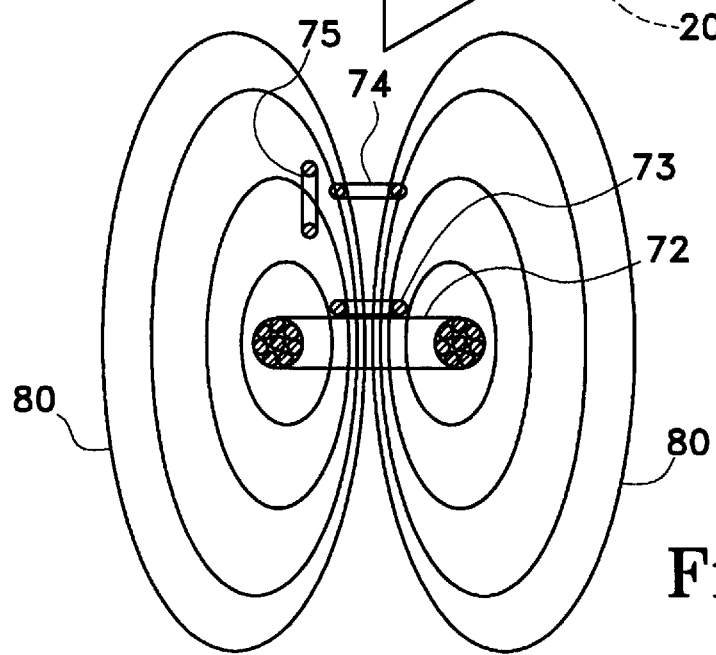
FIG. 15 shows the relationship between the coil on the antenna-side in the reader and the coil in the electronic tag.

FIG. 10 is applied to every embodiment of the present invention, and is a figure which explains the reading of a plurality of electronic tags in a short period of time. In FIG. 10, for example, cloth rolls 65 that use core 61 as an electronic tag device in the first embodiment shown in FIG. 1 are stored in container 68. Antenna 71 is opposite core 61.

When the container 68 is tilted toward antenna 71, all of the electronic tags move in the direction of antenna 71, and the distance between all electronic tags 20 and antenna 71 is maintained in a uniform position. That is, in regard to the power emitted from antenna 71, there is almost no change in the position of the electronic tags and thus the electrical processing of the data can be simple, accurate, and completed in a short period of time.

What is claimed is:

1. An electronic tag device for storing data readable by an external reading device, said tag device comprising an outer tube having a hollow interior extending along a predetermined longitudinal direction and an exterior having a substantially rectangular exterior cross section adapted to support a large sheet of flexible material, an inner tube fixed at one side of said hollow interior and extending along said longitudinal direction, said inner tube defining a substantially rectangular interior cross section substantially smaller than said exterior cross section, but having a fixed orientation relative thereto;

an electronic tag positioned inside said inner tube and free to move in said predetermined direction, and guide means for maintaining the tag in a predetermined angular orientation relative to the rectangular exterior cross section as the tag moves longitudinally within the hollow interior.

2. The electronic tag device according to claim 1, wherein said guide means comprises a longitudinal slit extending between the hollow interior of the outer tube and the rectangular interior of the inner tube; and a projection on the electronic tag extending through the slit into the hollow interior.

3. The electronic tag device according to any one of claim 1, or 2, wherein one part of said reading device is an antenna provided in the vicinity of one end of said outer tube.

* * * * *